Feb. 9, 1926.                                               1,572,414
H. E. WILBERT
SNOW SCOOPING AND MELTING APPARATUS
Filed March 17, 1925                 7 Sheets-Sheet 2

Feb. 9, 1926.

H. E. WILBERT

SNOW SCOOPING AND MELTING APPARATUS

Filed March 17, 1925  7 Sheets-Sheet 3

Patented Feb. 9, 1926.

1,572,414

UNITED STATES PATENT OFFICE.

HARRY E. WILBERT, OF HARRISBURG, PENNSYLVANIA.

SNOW SCOOPING AND MELTING APPARATUS.

Application filed March 17, 1925. Serial No. 16,219.

*To all whom it may concern:*

Be it known that I, HARRY E. WILBERT, a citizen of the United States of America, and resident of Harrisburg, in the county of Dauphin and State of Pennsylvania, have invented certain new and useful Improvements in Snow Scooping and Melting Apparatus, of which the following is a specification.

This invention relates to apparatus for removing snow from streets, railway tracks and the like, and for disposing of said snow by melting it; and it is an object of the invention to provide novel snow bank breaking means effective to displace a bank of snow in order that it may be taken by a scoop and elevator and conveyed to a melting tank which is a part of the apparatus.

It is a further object of this invention to produce a snow melting tank, associated with novel heat producing and distributing means effective to deliver the products of combustion from the retort or furnace to the tank in which the snow is being melted, whereby the full effects of the fuel will be obtained.

It is a still further object of this invention to provide a truck having power transmitting means from a motor to the traction wheels; and furthermore, to utilize the power of the motor for operating the conveyers, the snow bank breaker and the blower for maintaining draft in the furnace; and it is furthermore an object of the invention to provide novel means for manipulating the breaker in order that it may be caused to operate at different heights with respect to the roadbed on which the truck is operating.

It is a still further object of this invention to produce novel means for regulating the primary elevator or scoop which is accompanied by a shoe adapted to be supported in proximity to the roadbed, or the said shoe may be permitted to slide along on the roadbed.

It is a still further object of this invention to produce a water discharge pipe communicating with the tank to permit the melted snow to be discharged from the tank, and in order to direct the water to suitable places, such as the gutter of a street, or to ditches of a road, the said pipe is provided with hose that may be caused to carry the water to such distant places as will cause it to clear the roadbed or track on which the truck is operating, and as a convenient means for carrying the hose, the apparatus is provided with a hose reel associated with power applying means by which it may be rotated when the hose is to be wound on the reel.

It is a still further object of this invention to produce a snow elevator and melter of the character indicated having a fuel storing and feeding system communicating with the furnace where the fuel may be consumed through burners of any appropriate type.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 18 illustrates a sectional view of the telescopic shaft on the line 18—18 of Fig. 15;

Figure 25 illustrates a detail view of a water and slush agitating paddle.

In these drawings, 30 denotes any suitable chassis frame, associated with wheels such as 31, axles 32 and springs 33, although any suitable equipment may be employed for supporting the chassis frame. The wheels 31 which are arranged in pairs on the axles 32 are, in the present embodiment of the invention, provided as supports for the apparatus, and the traction wheels 34 are associated with transmission gear of known construction located in the housing 35.

The motor 36 may be of any appropriate type and adapted to drive a transmission of known type located in the transmission case 37.

It is the purpose of the inventor to have the transmission connected to a drive shaft 38 leading to the differential; a sectional shaft 39 connected by universal joints 40, which sectional shaft 39 extends to the front of the chassis frame for operating the snow breaker and elevator, as will presently appear, and it is a further object of the inventor to have the transmission gearing communicate motion to a power take-off shaft 41 which may be utilized for driving a blower to supply air for draft in the furnace.

As the parts just described may be of any conventional type, no attempt has been made to illustrate them in detail, since one skilled in the art will understand that by employing sectional shafts with universal joints, the device can be adapted to frames of different sizes and capacities.

Figure 1:
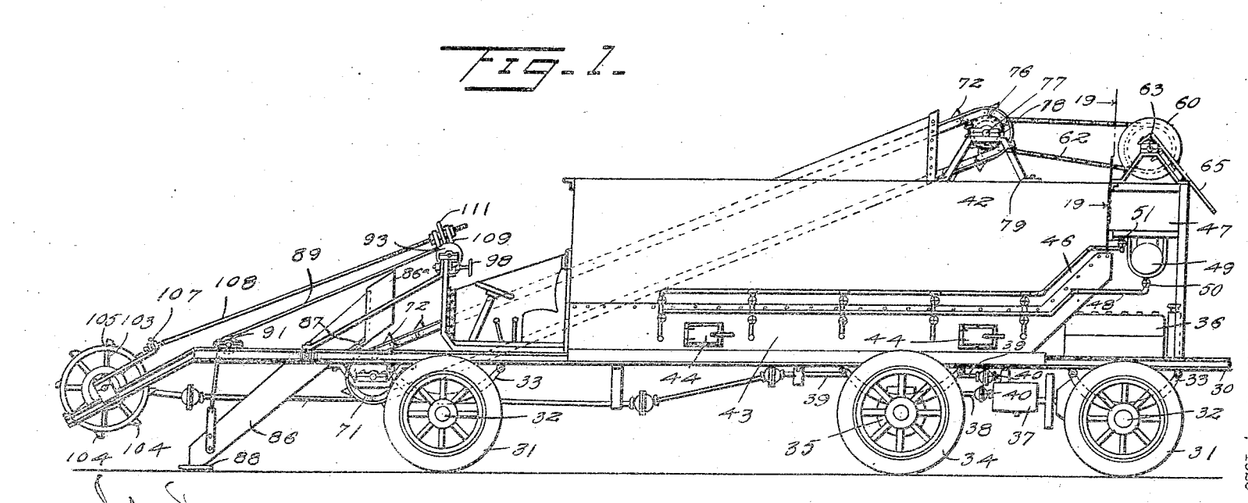
Figure 1 illustrates a view in side elevation showing a device embodying the invention.

The snow receiving and melting tank 42 is constructed as a unit with the furnace 43, and these are mounted on the chassis frame preferably near the rear thereof. The furnace has doors such as 44 in order that access to the burners 45 within the furnace may be had. The burners 45 may be of any type suitable for consuming liquid fuel, or, if desired, the furnace may be employed in connection with means for consuming other types of fuel, and the inventor does not wish to be limited with respect to these features. However, in the present embodiment of the invention, a fuel pipe 46 leads from the tank 47 to the burners and an air supply pipe 48 leads from the air tank 49, it being understood that air shall be supplied to the tank 49 through a compressor operated by the shaft 41, although other means may be provided for compressing air delivered to the air tank. Valves 50 and 51, conventionally shown in Fig. 1, may be employed for regulating the supply of air and fuel, respectively, so that proper combustion may be maintained in the furnace.

Pipes 52 and 53, each having a series of convolutions, has one end communicating through the snow receiving tank with the interior of the furnace, and each pipe may be anchored to the said snow receiving tank by a coupling such as 54. Each pipe 52 and 53 extends upwardly to near the top of the tank and terminates in a gooseneck 55 so that the discharge end of each pipe is below the normal water line of the tank. The products of combustion which are forced out of the furnace by the blower or the air pressure in the tank serve to cause the products of combustion to pass into the water and through the melting now, a condition which augments the melting action of the furnace, since the heat accompanying the products of combustion is utilized in this way as an economical provision for subjecting the snow to the action of the heat, A header 56 communicates with the tank through the outlets 57 and 58, and this header constitutes a discharge pipe to which a hose 59 may be connected for directing water from the tank to any convenient location, as has been explained. The outlets 57 and 58 being on different levels will permit the water to escape from the tank without liability of their being clogged by snow. A reel 60 is rotatably mounted on suitable brackets 61 near the rear end of the tank and it is the purpose of the inventor that this reel shall be utilized for storing the hose when the hose is not to be used. Provision is made for communicating motion to the reel through the sprocket chain 62 deriving power from the conveyer drive, as will presently appear. The reel shaft 63 is associated with a clutch 64 and the reel is moved axially of the shaft by the lever 65 in order that the clutch members may be carried into and out of operative engagement with relation to each other.

There is a conveyer housing 66 built into the snow receiving and melting tank and it is supported in an inclined position with the front end extending into an aperture 67 in the front wall of the said tank. A water-tight joint is effected between the housing and the front wall of the tank by a suitable angle iron 68, although other means may be provided for making this joint water-tight. The housing is provided with conveyer guides 69 and 70 on which the conveyer 71 operates. The said conveyer, in the present embodiment of the invention, is of the link type and it has buckets 72 at appropriate intervals which are effective to carry snow through the housing to the upper end of the said housing where it is discharged into the tank. The presence of the conveyer housing, a portion of which is submerged in the contents of the tank has that part of the conveyer housing within the tank surrounded by the melted or melting snow which is at a higher temperature than the snow passing through the conveyer housing so that the temperature of the conveyer housing is raised and the snow carried by the conveyer has its temperature raised and the snow will be more expeditiously discharged from the conveyer blades.

The conveyer is driven by a sectional shaft 39 and a worm gear 73. The worm wheel 73 rotates a shaft 74 having sprocket wheels 75 on which the conveyer chains operate, it being shown that the said conveyer chains also engage sprocket wheels 76 on a shaft 77 which is rotatably supported by the bearing 78 of the brackets 79, the latter of which are located on the tank. It is through the employment of a sprocket chain 80 on the shaft 77 that the sprocket chain 62 is driven for rotating the hose reel.

Means are provided within the tank for circulating the snow and water and preferably the motion of the agitator is relatively slow. As here shown, the agitator comprises a shaft 81 having paddles 82, the said shaft being rotatably mounted in bearings supported on the inner walls of the melting tank. The shaft has a sprocket wheel 83 secured on it and this sprocket wheel is engaged by a sprocket chain 84 that operates over a sprocket wheel 85 on the conveyer shaft 77.

The snow scoop 86, in the present embodiment of the invention, is slidably supported on a bracket 87 at its rear end, whereas its forward end has a shoe 88 secured to it, which may ride on the roadbed, or the said shoe may be supported clear of the roadbed by the hanger cables 89. The cables 89 are connected to the scoop as shown at 90, and the said cables operate over sheaves 91 and over drums 92 and 93 on the shaft 94. The shaft 94 has a worm wheel 95 secured on it, and the worm wheel is engaged by a worm 96 rotatable in the bracket 97, so that by manipulating the hand wheel 98 of the worm shaft, the scoop may be elevated or lowered, according to the direction of rotation of the said hand wheel. By reason of the means just described, the shoe of the scoop may be positioned at proper positions with relation to the roadbed, or it may be raised to clear obstructions, should they be encountered.

In the event of it being desirable to supply the device with a snow bank breaker, the side members of the chassis frame may be provided with extending arms 99 preferably diverging laterally in order that they will clear the sides of the scoop. The extending arms 99 are provided at their outer ends with guide arms 100 on which the bearings 101 are slidable, it being shown that the guiding arms and bearings have tongue and groove connections which prevent the bearings from disengaging from the guide arms.

A shaft 102 is rotatable in the bearings 101 and this shaft is provided with a drum 103 having snow engaging and displacing blades 104. The construction of the drum may be changed to suit particular requirements, but as here shown, it has end heads connected by bars 105, and the said bars are secured to the heads by fastenings 106, such as lag screws or the like, and the said bars carry the blades 104, to which reference has been made.

In order that the height of the breaker wheel or drum may be regulated, the bearings of the breaker wheel are connected by a yoke 107 and a rod 108 leads from the said yoke rearwardly to a bracket 109. The rear end of the rod 108 has threads 110 engaged by the threads of a wheel 111 in order that when the wheel 111 is rotated, the rod 108 will be projected or retracted, according to the direction of rotation of the wheel 111, and the breaker wheel is thereby lowered on its supporting members or elevated thereon in order that the said breaker wheel may be brought to proper position with relation to the bank of snow to be dislodged.

Figures 2, 9:
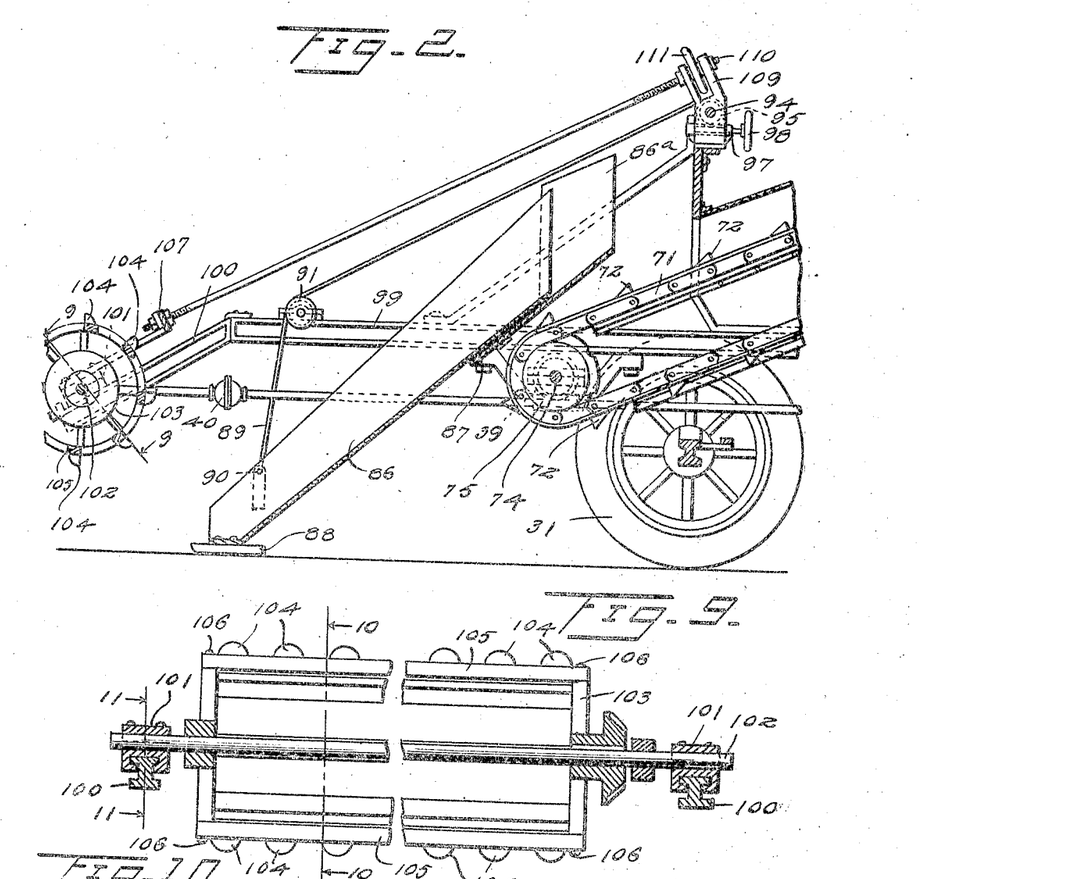
Figure 2 illustrates an enlarged detail view of the front portion of the apparatus, partly in section.
Figure 9 illustrates a sectional view of the breaker drum and parts associated with it on the line 9—9 of Fig. 2.
Figure 3:
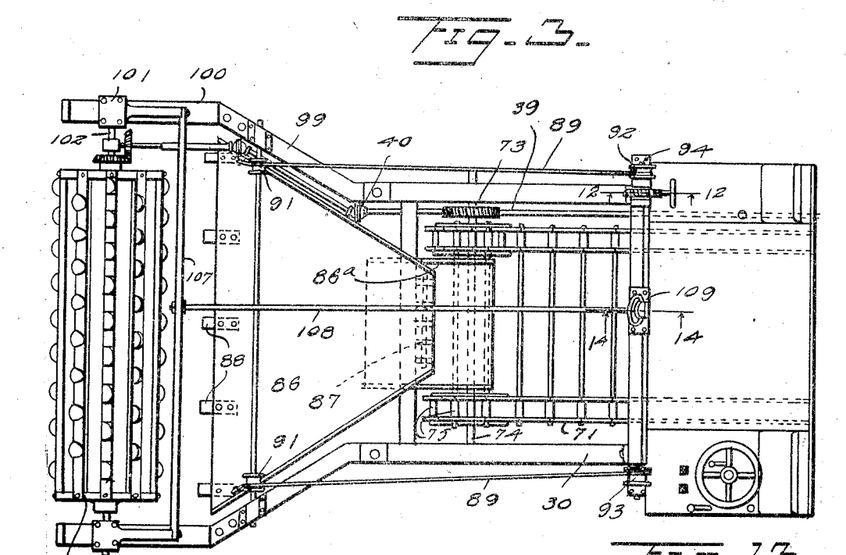
Figure 3 illustrates a top plan view thereof.
Figure 4:
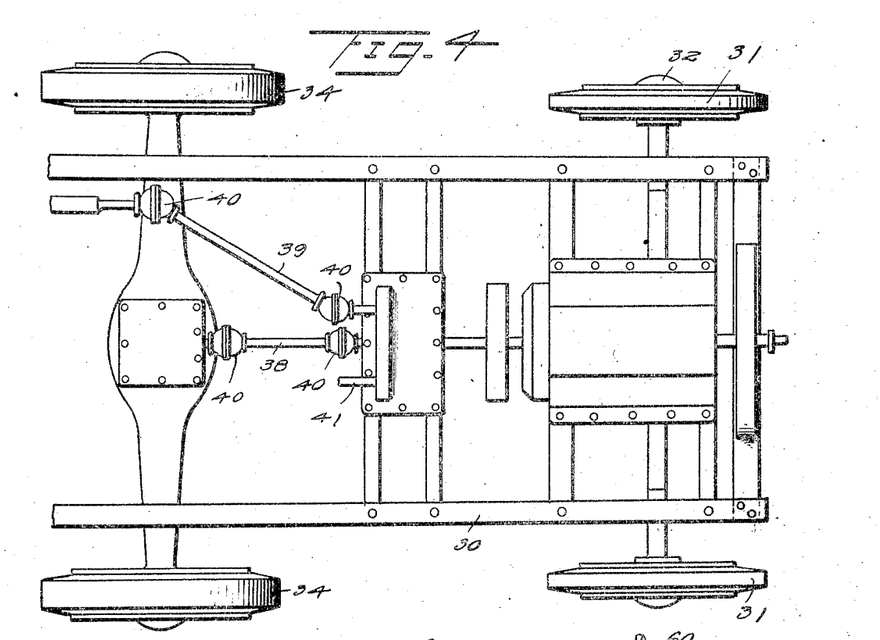
Figure 4 illustrates an underneath plan view of the truck at the rear thereof.
Figures 5, 6:
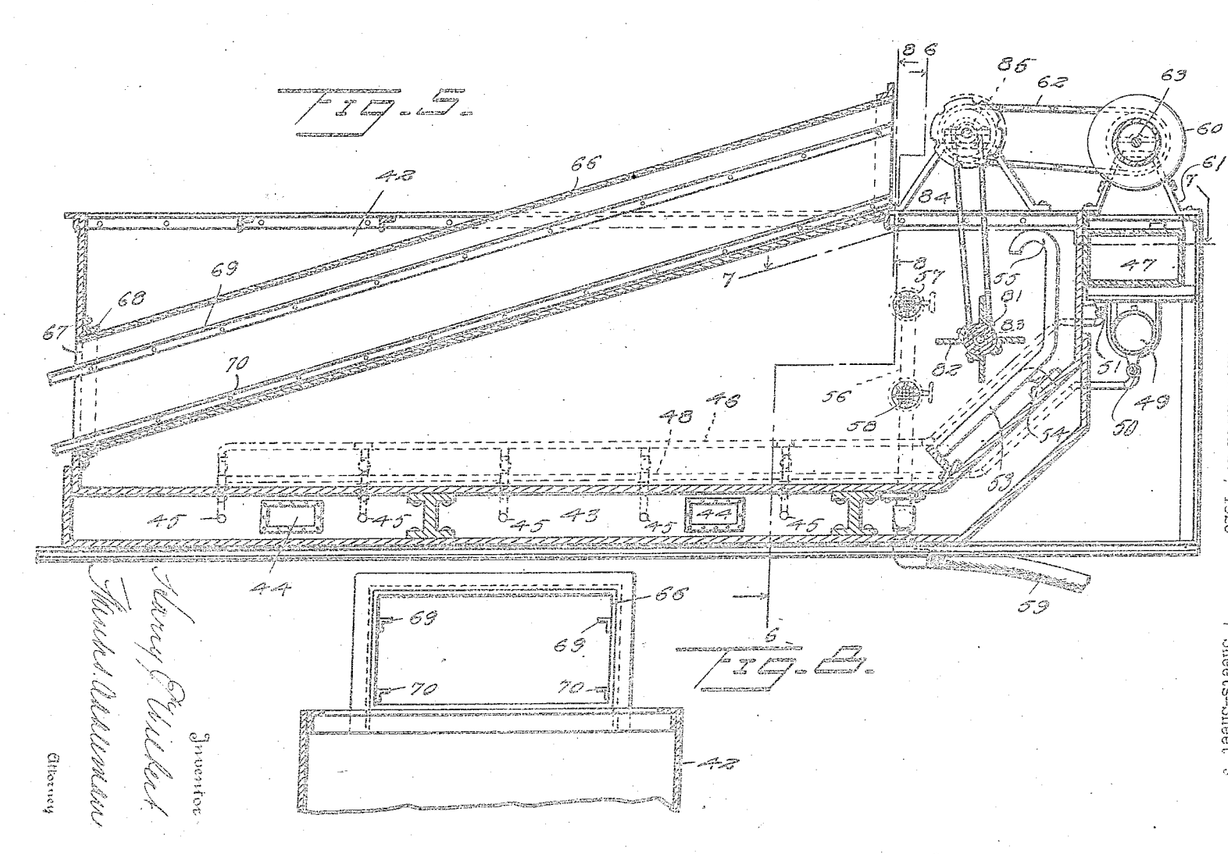
Figure 5 illustrates a sectional view of the tank, furnace and fuel supplying system.
Figure 6 illustrates a vertical sectional view of the tank and furnace on a line 6—6 of Fig. 5.
Figures 7, 8:
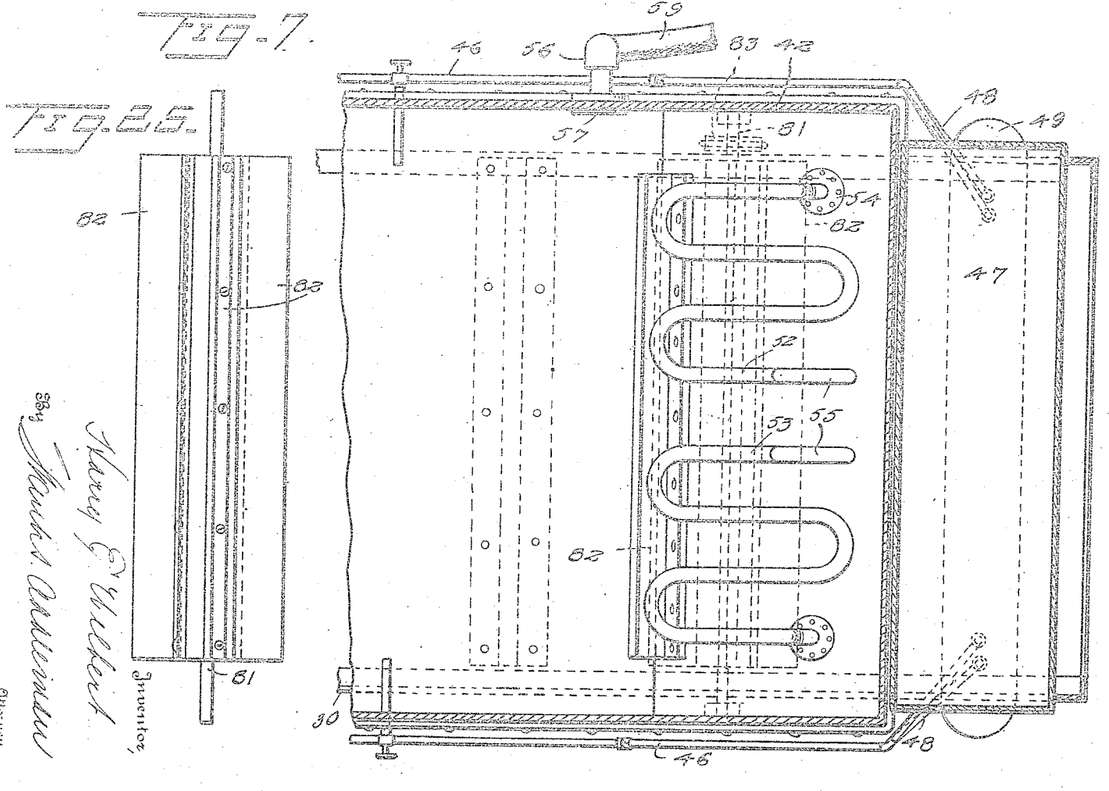
Figure 7 illustrates an enlarged sectional view of the device on the line 7—7 of Fig. 5.
Figure 8 illustrates a sectional view of the device on the line 8—8 of Fig. 5.
Figure 10:
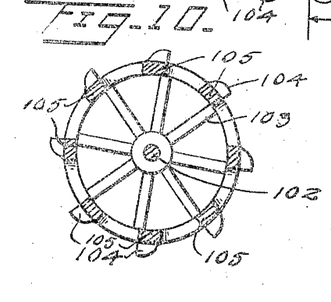
Figure 10 illustrates a sectional view of the said breaker drum on the line 10—10 of Fig. 9.
Figure 11:
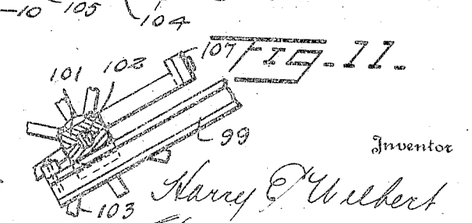
Figure 11 illustrates a sectional view of the bearing for the breaker shaft on the line 11—11 of Fig. 9 with the bearing supporting arm in elevation.
Figure 12:
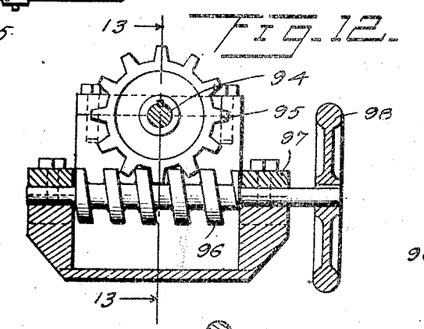
Figure 12 illustrates a sectional view on the line 12—12 of Fig. 3.
Figure 13:
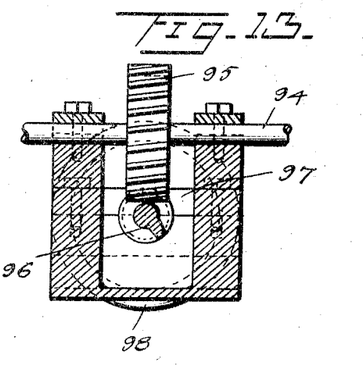
Figure 13 illustrates a sectional view on the line 13—13 of Fig. 12.
Figures 14, 15, 16, 17:
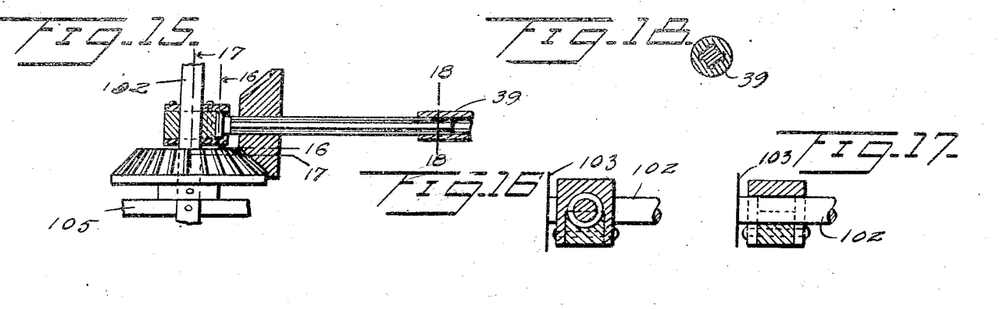
Figure 14 illustrates a sectional view on the line 14—14 of Fig. 3.
Figure 15 illustrates a detail view partly in section of the drive for the breaker drum or wheel.
Figure 16 illustrates a sectional view on the line 16—16 of Fig. 15.
Figure 17 illustrates a sectional view on the line 17—17 of Fig. 15.
Figure 14:
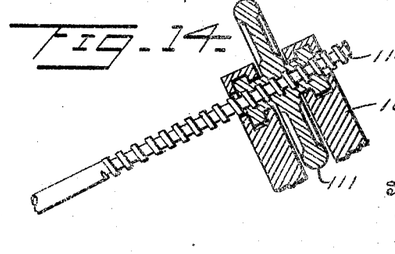
Figure 19:
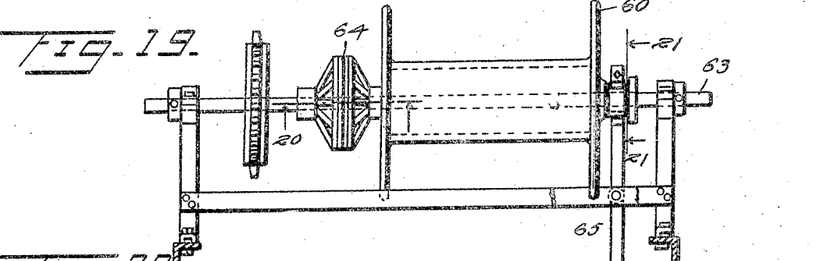
Figure 19 illustrates a view in elevation of the hose reel.
Figures 20, 21:
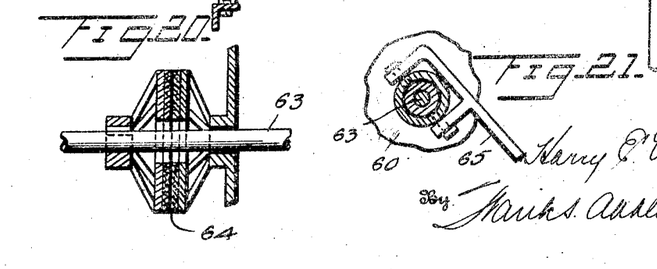
Figure 20 illustrates a sectional view on the line 20—20 of Fig. 19.
Figure 21 illustrates a sectional view on the line 21—21 of Fig. 19.
Figure 21:
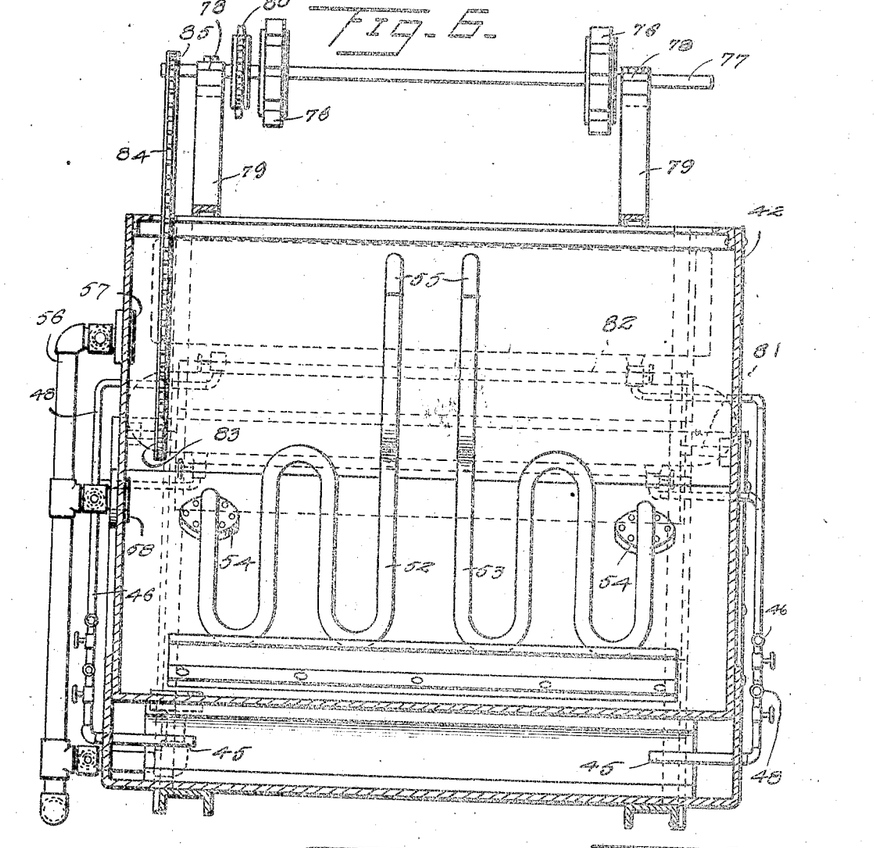
Figures 22, 23, 24:
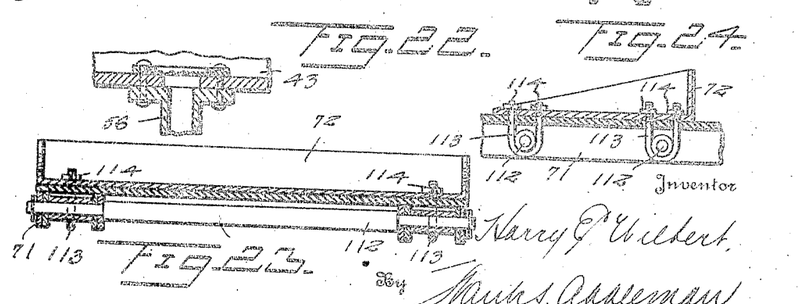
Figure 22 illustrates a sectional view of the tank showing the outlet pipe connected thereto.
Figure 23 illustrates a sectional view of the conveyer.
Figure 24 illustrates a detail view of a conveyer bucket associated with a fragment of the conveyer.

It is shown that the scoop 86 has a hood 86ª at its rear and that the said scoop may move up or down in the hood so that the hood will cooperate in discharging snow to the elevator, which, as shown in Fig. 2, is located beneath the discharge end of the hood.

The links of the conveyer chain have pins or pintles 112 which connect the links, and these pintles are embraced by U-bolts 113 that extend through the bottoms of the buckets for holding the buckets in place. Nuts 114 are threaded on the U-bolts and serve to retain the parts just described in their assembled positions.

I claim:

1. In a snow scooping and melting apparatus, a truck having a tank thereon, a housing extending through the front end of the tank and supported in an inclined position in said tank, a conveyer mounted for operation through the housing, means for heating the tank, and means for operating the conveyer for carrying snow to the tank.

2. In a snow scooping and melting apparatus, a truck having a tank thereon, a housing extending through the front end of the tank and supported in an inclined position in said tank, a conveyer mounted for operation through the housing, a scoop in front of the conveyer for directing snow to the conveyer, a stationary hood above the conveyer with relation to which the scoop is movable, means for heating the tank, and means for operating the conveyer for carrying snow to the tank.

3. In a snow scooping and melting apparatus, a truck having a tank thereon, a housing extending through the front end of the tank and supported in an inclined position in said tank, a conveyer mounted for operation through the housing, a furnace under the tank, pipes having loops located in the tank and communicating with the furnace, the said pipes having upwardly extending portions terminating in gooseneck discharge ends located within the tank, and means for operating the conveyer.

4. In a snow melting tank, a receptacle, a furnace thereunder, discharge pipes for the products of combustion communicating with the furnace and extending in a circuitous passage through the tank, the said pipes having upstanding portions within the tank terminating in goosenecks having their discharge ends below the normal water line of the tank, substantially as described.

HARRY E. WILBERT.